Figure 1:
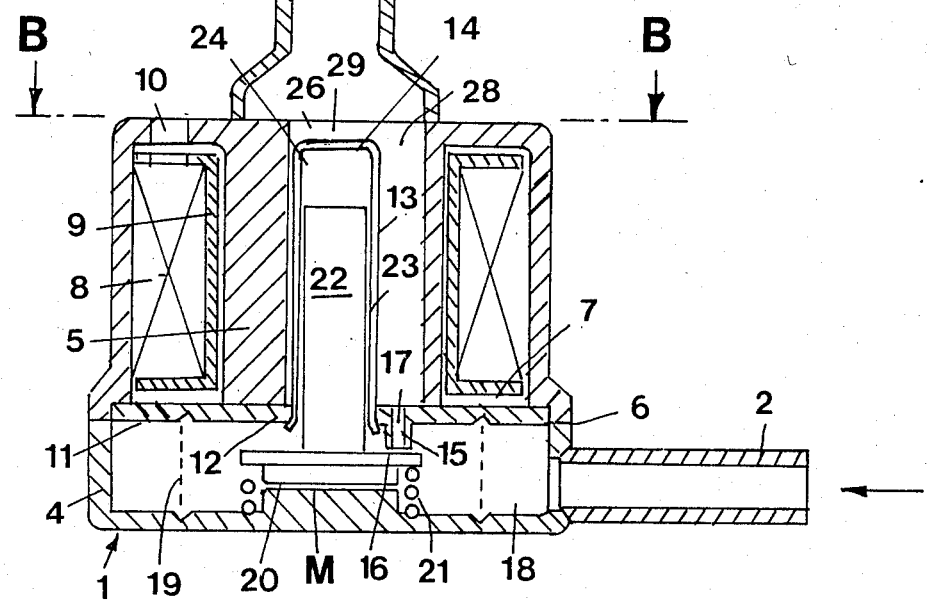

United States Patent [19]

Valbjørn et al.

[11] Patent Number: 4,614,327
[45] Date of Patent: Sep. 30, 1986

[54] VALVE FOR VOLATILE LIQUIDS, PARTICULARLY EXPANSION VALVE FOR REFRIGERATION PLANTS

[75] Inventors: Knud V. Valbjørn, Nordborg; Poul O. Meldgaard, Fynshav, both of Denmark

[73] Assignee: Danfoss A/S, Nordborg, Denmark

[21] Appl. No.: 791,751

[22] Filed: Oct. 28, 1985

[30] Foreign Application Priority Data

Nov. 12, 1984 [DE] Fed. Rep. of Germany ....... 3441251

[51] Int. Cl.$^4$ ..................... F16K 31/06; F25B 41/04
[52] U.S. Cl. ..................... 251/129.16; 251/129.21; 236/92 B
[58] Field of Search ............ 251/129.16, 129.21; 236/92 B

[56] References Cited

U.S. PATENT DOCUMENTS

| | | | |
|---|---|---|---|
| 984,151 | 2/1911 | Okey | 251/129.16 X |
| 2,876,753 | 3/1959 | Chandler | 251/129.21 X |
| 3,967,781 | 7/1976 | Kune | 236/92 B X |

*Primary Examiner*—Arnold Rosenthal
*Attorney, Agent, or Firm*—Wayne B. Easton

[57] ABSTRACT

The invention relates to a valve for volatile liquids such as an expansion valve for a refrigeration plant. Magnetic valves of this type have a plunger actuated closure member which controls a small throttle opening which functions to vaporize the cooling liquid. The valve action can be noisy and damping chambers have been provided for damping the movement of the plunger. As disclosed herein such a damping chamber is disposed in the flow path downstream from the throttle opening where a cooling vaporization occurs and the cooling vaporization is effective to minimize vaporization in the damping chamber which would otherwise reduce the effectiveness of the damping chamber.

2 Claims, 2 Drawing Figures

VALVE FOR VOLATILE LIQUIDS, PARTICULARLY EXPANSION VALVE FOR REFRIGERATION PLANTS

The invention relates to a valve for volatile liquids, particularly an expansion valve for refrigeration plants, of which the throttle point is closable by a closure member having an actuating apparatus, comprising damping apparatus having a substantially cylindrical damping chamber, a compressor piston engaged therein and connected to the closure member, and at least one throttle passage between the inlet side of the valve and the damping chamber.

In a known valve of this kind (DE-OS No. 30 45 892), the closure member of the valve can be lifted off the valve seat with the aid of a valve tappet against the force of a return spring. A cup-shaped piston which engages in the cylindrical hole of a set screw supporting the return spring acts on the side of the closure member remote from the valve seat. The damping chamber thus formed is connected to the inlet chamber of the valve by way of a throttle bore in the cup-shaped piston and/or by way of the annular gap between the piston and the cylindrical bore and/or by way of a throttle groove at the outside of the piston or the inside of the cylindrical bore. The damping chamber is separated from the valve seat by this inlet chamber.

This liquid valve has the advantage that the movement of the closure member is damped or braked because, upon an increase or decrease in the volume of the damping chamber, liquid must flow by way of the throttle between the damping chamber and the inlet chamber. Particularly in the case of refrigeration plant, one can in this way ensure that the valve will not oscillate in resonance with pressure pulses caused by the compressor, which would create vibratory noises. Another advantage is that the same liquid that flows through the valve can also be employed for damping purposes. Whereas valves for normal liquids of this kind will operate without trouble, difficulties have been experienced in the case of valves for volatile liquids. More particularly, damping sometimes decreased or disappeared altogether.

The invention is based on the problem of providing a valve of the aforementioned kind which affords proper damping even upon operation with volatile liquid.

This problem is solved according to the invention in that the damping chamber is associated with cooling apparatus which is downstream of the throttle point and in which part of the liquid vaporises.

This construction is based on the consideration that, upon an increase in the volume of the damping chamber, the pressure therein drops. If the temperature of the volatile liquid on the inlet side of the valve is only slightly below boiling point, this decrease in pressure leads to partial evaporation, whereby damping is considerably reduced or even completely eliminated. Since the conditions as described depend on the temperature of the liquid on the inlet side and the latter, in turn, is often influenced by the ambient temperature, it will be evident that in many known cases the damping effect was not always affected but only temporarily.

On the other hand, if one uses a cooling apparatus for the damping chamber, one ensures that the liquid in the damping chamber will have such a low temperature that no vaporisation will take place even in the case of a pressure drop as a result of an increase in the volume of this damping chamber. This ensures a damping effect at all times. It is particularly advantageous that the cooling apparatus can be operated with the volatile liquid itself so that no large expense is required.

In particular, the cooling apparatus can be formed by a cooling chamber disposed adjacent to the damping chamber between the throttle point and the valve outlet. Since there is a considerable pressure drop at the throttle point of such valves, the liquid in the said cooling chamber has a greater tendency to evaporate, whereby the adjacent damping chamber is well cooled.

Preferably, the cooling chamber has a cooling passage parallel to the damping chamber axis. This leads to intensive heat transfer.

In a preferred embodiment, the damping chamber is formed by a sleeve which is closed at one end and pushed into the axial passage of a housing having at least one cooling passage parallel thereto in communication with the throughway of the closed end of the sleeve. In this construction, the damping chamber can be very simple designed. It is also advantageous that the damping chamber can also be cooled by way of the closed base of the sleeve. By selecting the sleeve material and the thickness of the sleeve or its base, one can improve the heat transfer.

The at least one cooling passage can for example be formed by a bore parallel to the axial throughway. However, it is more favourable for the axial throughway to be cylindrical and have a radial enlargement at least in extension of the eccentrically arranged throttle point. In this case, the sleeve is directly cooled in the region of the radial enlargement, which gives a good cooling effect because of the thin wall of the sleeve.

With particular advantage, the valve is a magnetic valve and its solenoid plunger is the damping piston and the cooling apparatus is formed by a cooling chamber having at least one cavity in the coil housing. Although the coil generates heat during operation and the damping chamber is endangered particularly through heating, damping will not be limited because there is adequate cooling of the damping chamber. Such damping is particularly important in the case of magnetic valves. The switching noises can be very much reduced when there is frequent switching on and off. Further, pulsations (knocking) are avoided in the liquid conduit between the condenser and expansion valve of refrigeration plant. Further, the life of the magnetic valve is considerably increased.

From a constructional point of view, it is advisable for the coil housing of magnetically conductive material to have an annular groove which is open at the end and receives the coil, for the annular groove to be covered by a dividing plate of magnetically non-conductive material carrying between the annular groove and the damping chamber a valve seat with a downstream throttling point, for an inlet chamber having an inlet nipple to be formed between the dividing plate and a cup-shaped base of magnetically conductive material, the inlet chamber carrying a central magnetic surface for the closure member in the inlet chamber, and for the opposite side of the coil housing to be provided with an outlet nipple. This results in a compact valve which nevertheless fulfils all functions efficiently.

Figure 2:
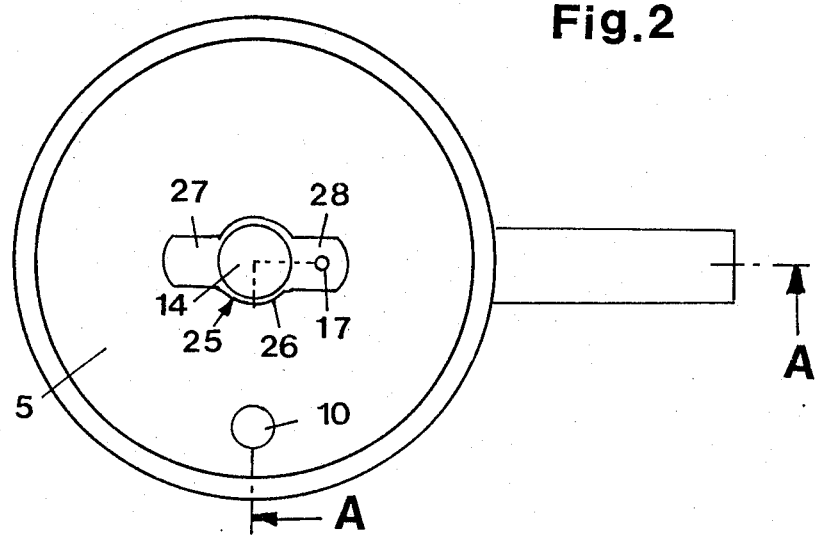

A preferred example of the invention will now be described in more detail with reference to the drawing, wherein:

FIG. 1 is a longitudinal section through a valve according to the invention taken on the line A—A in FIG. 2 and FIG. 2 is a plan view of the coil housing on the line B—B in FIG. 1.

The illustrated valve comprises a housing 1 with an inlet nipple 2 and an outlet nipple 3. The valve housing 1 consists of a cup-shaped base 4 and a coil housing 5, both of magnetically conductive material and being interconnected along the joint 6. The coil housing 5 has an annular groove 7 open at one side and receiving a magnetic coil 8 on its support 9. The supply (not shown) passes through an aperture 10.

The side of the coil housing 5 opposite to the outlet nipple 3 is covered by a dividing plate 11 of non-magnetic material having a central aperture 12 for receiving a sleeve 13 with a closed base 14 and adjacent thereto carrying a nipple 15 which forms a valve seat 16 and a throttle point 17. The dividing wall 11 and cup-shaped base 4 together form an inlet chamber 18 in which there is also an annular screen 19. The dividing wall 11 is sealingly welded to the housing 5 and sleeve 13.

A closure member 20 in the inlet chamber 18 can co-operate with the valve seat 16, be biassed by a return spring 21 and co-operate with a magnetic surface M centrally disposed at the cup-shaped base 4. The closure member 20 is provided with a solenoid plunger 22 which engages in the sleeve 13 to leave an annular gap 23.

In operation, the sleeve 13 forms a damping chamber 24 and the solenoid plunger 22 forms a damping piston. This damping chamber 24 communicates with the inlet chamber 18 by way of the annular gap 23. Upon reciprocation of the damping piston 22, the volume of the damping chamber 24 is increased or reduced, in which case liquid will be sucked out of the inlet chamber or pressed back into it.

The coil housing has an axial throughway 25 with a cylindrical section 26 and two radial enlargements 27 and 28. The sleeve 13 is pushed into the cylindrical section 26. The radial enlargement 28 is disposed as an extension of the throttling point 17. Altogether, one therefore obtains a continuous cooling chamber 29 comprising the chambers 27 and 28 as well as the end of the cylindrical section 26 disposed beyond the base 14.

Upon excitation of the coil 8, the closure member 20 is attracted to the magnetic surface M against the force of the spring 21. This takes place under an increase in the volume of the damping chamber 24. The pressure in this chamber drops, and liquid is sucked from the inlet chamber 18 by way of the annular gap 23. The valve opens correspondingly slowly. Liquid will then reach the chamber 29 by way of the throttle point 17. Since the pressure is low here, the liquid vaporises partially and thereby cools the damping chamber. Accordingly, the liquid in the damping chamber has a sufficiently low temperature so as not to vaporise despite a drop in pressure. The same damping effect will be obtained when switching the coil 8 off if the closure member is brought to the closing position under the influence of the return spring 21.

Instead of the illustrated radial enlargements 27 and 28, the housing 5 may also contain axial bores through which the liquid is led to the nipple 3 while partially evaporating.

We claim:

1. A valve for volatile liquids such as an expansion valve for refrigeration plants, comprising, a magnetic coil, a member forming a central opening with outlet means at one end of said opening and an inlet chamber at the other end of said opening, partition means between said inlet chamber and said opening, said housing forming a support for said magnetic coil which is mounted thereon in surrounding relation to said opening, a plunger in said central opening actuateable by said coil and having a closure member disposed in said inlet chamber, cylinder means in surrounding relation to said plunger opening into said inlet chamber and having a closed end opposite said closure member, said cylinder means forming a damping chamber for damping the movement of said closure member, fluid flow passage means providing a flow path from said inlet chamber to said outlet means including a throttle passage in said partition means and an intermediate path section bounded by said cylinder means and said central opening, the flow in said intermediate path section being downstream of said throttle passage where a cooling vaporization occurs, said cooling vaporization in contact with said cylinder means being effective to minimize vaporization in said damping chamber which would otherwise reduce the effectiveness of said damping chamber.

2. A valve according to claim 1 characterized in that said central opening has a generally cylindrical portion in which said cylinder means is disposed.

* * * * *